United States Patent Office.

FRANCIS SCHLEIFER, OF SAN FRANCISCO, CALIFORNIA, ASSIGNOR TO HIMSELF AND FRANCIS CUTTING, OF SAME PLACE.

Letters Patent No. 93,127, dated July 27, 1869.

IMPROVED PROCESS OF PURIFYING AND REFINING ALCOHOLIC LIQUIDS.

The Schedule referred to in these Letters Patent and making part of the same.

*To all whom it may concern:*

Be it known that I, FRANCIS SCHLEIFER, of the city and county of San Francisco, State of California, have invented an Improved Method for Purifying Alcohol; and I do hereby declare that the best mode which I have discovered, for performing said process, is described in the following specifications, with the best apparatus which I have found or devised for performing the same.

My invention consists in the introduction of atmospheric air in the still in sufficient quantities, for the purpose of chemically destroying the fusil-oils, by means of the oxygen contained in the said air.

It is a well-known fact that all alcohols contain more or less fusel-oils, of different compounds, according to the ingredients employed in its manufacture, whether made from potatoes, molasses, grain, or other materials; and, furthermore, that all alcoholic liquors improve by age. The reason assigned for this is, that the air is more or less in contact with the liquor, and, after a sufficient time has elapsed, the fusel-oils are destroyed, and converted into other substances.

It is also conceded that the first run of distilled spirits is the best. The reason assigned for this is, that in the beginning of the distillation-process, a sufficient quantity of air is already in the still for destroying the fusel-oil at first, but this atmospheric air is soon expelled by the alcoholic and watery vapors, and then the condensed alcoholic liquids are always impregnated with the fusel-oils to a greater or less extent. But by my method or process, such is not the case, the fusel-oils being all decomposed into soluble and insoluble products; and, furthermore, the soluble products of such decomposition being volatile, go over, in the distillation, with the alcohol, and is not only divested of its noxious influence, but imparts at once to the alcoholic liquid those valuable properties known as age, mildness, flavor, &c., while the solid or insoluble products of this decomposition are suspended in the residuum remaining in the still.

In order to accomplish this object, and to obtain an alcoholic liquor perfectly free from fusel-oils, I introduce a pipe into the still, at any point below the top of the liquor being distilled, and force or impel cold air into it, either with a bellows, force-pump, or other apparatus, a few strokes from time to time being all that is necessary. By this means, the oxygen of the air acts chemically on the fusel-oils, decomposing them, and alcoholic liquors are obtained perfectly free from such deteriorating oils, while the product tastes sweet and mild, and shows at once, to a great degree, the property or quality known as age.

To ascertain the fact that the fusel-oils are destroyed, proof may at any time be obtained by the chemical test of nitrate of silver.

Having thus described my invention,

What I claim, and desire to secure by Letters Patent, is—

The introduction of atmospheric air into the still, below the surface of the liquor, in sufficient quantities to produce, by the presence of the oxygen in the said air, a chemical decomposition of the fusel-oils of alcoholic liquids, in the manner substantially as described, for the purposes set forth.

In witness whereof, I have hereunto set my hand and seal.

FRANCIS SCHLEIFER. [L. S.]

Witnesses:
C. W. M. SMITH,
J. L. BOONE.